United States Patent [19]
DiRocco

[11] Patent Number: 4,708,608
[45] Date of Patent: Nov. 24, 1987

[54] HEAT PAD

[76] Inventor: Jobbie DiRocco, 3424 Sweetbriar Ave., Akron, Ohio 44321

[21] Appl. No.: 875,088

[22] Filed: Jun. 17, 1986

[51] Int. Cl.⁴ .......................................... B29C 35/02
[52] U.S. Cl. ......................................... 425/14; 156/97; 156/381; 156/583.3; 219/243; 219/535; 425/15; 425/41
[58] Field of Search .................. 425/41, 11, 28 R, 14, 425/15; 264/36; 156/97, 381, 583.3, 583.6; 219/243, 535

[56] References Cited

U.S. PATENT DOCUMENTS

| 926,695 | 6/1909 | Frost | 425/14 |
|---|---|---|---|
| 2,449,606 | 9/1948 | Kraft | 425/14 |
| 2,617,916 | 11/1952 | Neidnig | 219/528 |
| 3,178,560 | 4/1965 | Mapp et al. | 219/528 |
| 3,359,524 | 12/1967 | Gallacher et al. | 219/528 |
| 3,922,415 | 11/1975 | Dexter | 425/41 |
| 3,940,463 | 2/1976 | Nicholson | 425/14 |
| 4,055,526 | 10/1977 | Kryokawa et al. | 264/22 |
| 4,284,451 | 8/1981 | Conley | 425/14 |
| 4,334,148 | 6/1982 | Kampe | 219/553 |
| 4,444,708 | 4/1984 | Gale et al. | 264/105 |
| 4,505,848 | 3/1985 | Kobayashi | 252/511 |
| 4,548,740 | 10/1985 | von Tomkewitsch et al. | 252/511 |
| 4,560,524 | 12/1985 | Smuckler | 264/105 |

FOREIGN PATENT DOCUMENTS 2024579  1/1980  United Kingdom ................ 219/549

Primary Examiner—Willard E. Hoag
Attorney, Agent, or Firm—Frederick K. Lacher

[57] ABSTRACT

A heat pad for pressing against a curved surface of an annular tire to vulcanize a tire patch having a channel-shaped sheet member of resilient conductive rubber material with reinforcing electrodes adhered to the sheet member at the elongated side edges, a cover of insulating rubber material encasing the sheet member and an intermediate portion between the electrodes stretchable to conform to the curved surface of the tire under pressure from a pressing member urging the pad against the tire.

12 Claims, 6 Drawing Figures

HEAT PAD

BACKGROUND OF THE INVENTION

Heat pads have been used in repair molds to heat tire patches for repairing tires and especially large size tires for trucks and off-the-road vehicles. In the repair of these tires a patch is applied which may include a plug core inserted in the injury. A mandrel may then be inserted in the tire cavity with an airbag and heat pad for pressing and heating the inside of the tire. A heat pad and airbag may then be positioned around the outside of the tire and the tire with the mandrel, airbags and heat pads placed inside a repair mold for spot curing the patch.

Heretofore the heat pads have been heated electrically by coiled nichrome wires sewn in fiberglass and molded in heat-resistant insulating rubber. Due to the high pressure exerted on the heat pads by the air-bags, the heat pads have been deformed and stretched over the curved surface of the annular tire which has caused the nichrome wires to break and curtail the service life of these heat pads. The failure of the heat pads has increased the cost of spot curing and has also resulted in incomplete vulcanization of the tire patches and scrapping of the tires. Also the time required to bring the heat pad up to a temperature where the curing of the patch material will start and the time required to bring the heat pad up to the desired maximum curing temperature has been extended because of the thickness of the heatresistant insulating rubber in which the nichrome coiled wires are embedded.

SUMMARY OF THE INVENTION

The heat pad of this invention provides for heating with a channel-shaped sheet of conductive rubber without requiring heating coils. The electrodes are positioned at the edges for limiting stretching at the edges while permitting substantial stretching and deformation in the intermediate portion between the electrodes where the heat pad is pressed against the curved surface of the tire where the patch is located. The time required to bring the heat pad up to a temperature where the curing of the patch material will start and the time required to bring the heat pad up to the desired maximum curing temperature is minimized because of the heating by the sheet of conductive rubber and the relatively thin layers of insulating rubber covering the sheet of conductive rubber.

In accordance with an aspect of this invention there is provided a heat pad for pressing against a curved surface of an annular tire to vulcanize a tire patch comprising a channel-shaped sheet member of resilient conductive rubber material having spaced-apart elongated side edges and U-shaped end edges, a first electrode adhered to the sheet member at a position adjacent one of the side edges, a second electrode adhered to the sheet member at a position adjacent the other of the side edges, a cover member of resilient insulating rubber material encasing the sheet member of resilient conductive rubber material, means to connect the first electrode and the second electrode to a source of electricity to heat the sheet member of resilient conductive rubber material, the heat pad having an intermediate portion between the first electrode and the second electrode for pressing against the curved surface of the annular tire and the intermediate portion being stretchable in a direction radially of the tire and in a direction circumferentially of the tire to conform to the curved surface of the tire under pressure from a pressing member urging the heat pad against the tire.

DETAILED DESCRIPTION

Figure 1:
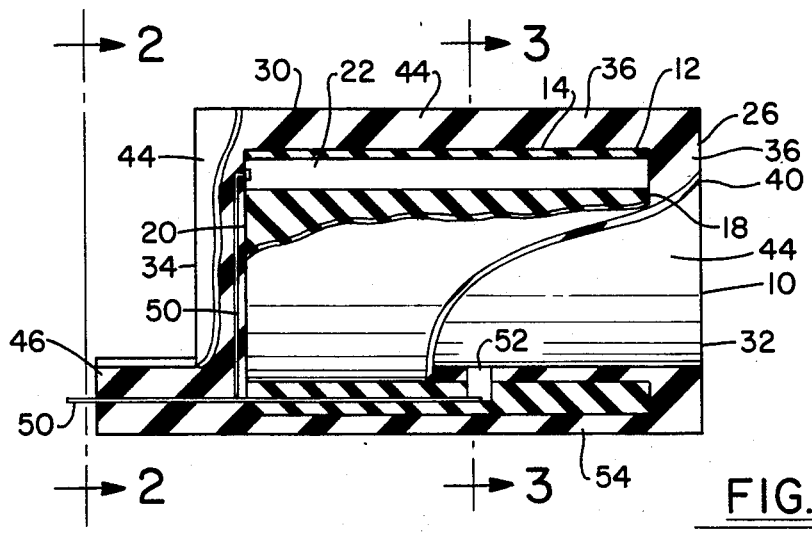
FIG. 1 is a section of the heat pad embodying the invention with the top cover layer broken away to show the sheet member which is also broken away to show the position of the electrode and the connecting wires taken along line 1—1 in FIG. 2.
Figures 2, 3:
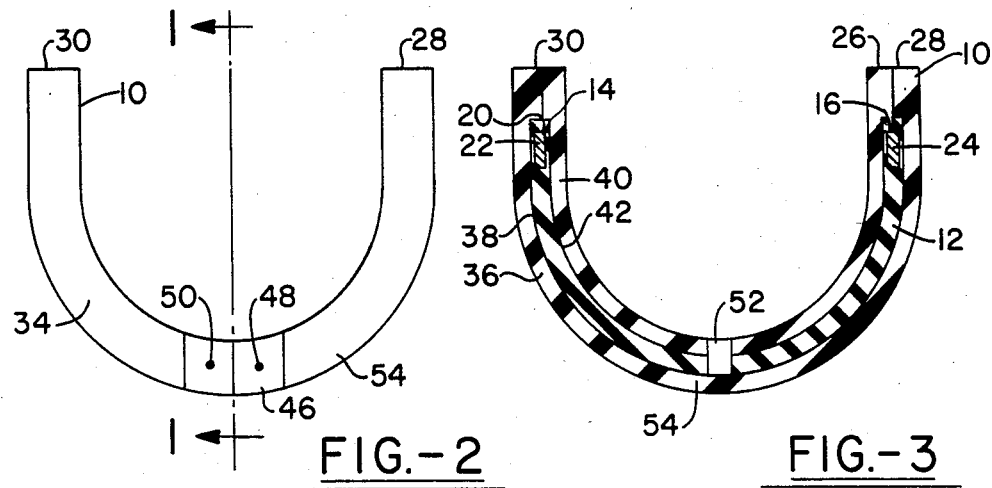
FIG. 2 is an end view taken along line 2—2 in FIG. 1.
FIG. 3 is a sectional view taken along line 3—3 in FIG. 1.

Referring to FIGS. 1 through 3, a heat pad 10 is shown having a channel-shaped sheet member 12 of resilient conductive rubber material such as acrylic polymers. The sheet member 12 of this embodiment is of silicone rubber and has an elongated first side edge 14 spaced apart from an elongated second side edge 16 and spaced-apart U-shaped end edges 18,20. A first electrode 22 is adhered to the sheet member 12 at a position adjacent the first side edge 14, and a second electrode 24 is adhered to the sheet member at a position adjacent the second side edge 16. The first electrode 22 and second electrode 24 are of an electrically conductive material which is substantially nonstretchable and, in this embodiment, is copper.

A cover member 26 encases the sheet member 12 and is of a resilient insulating rubber material. In the embodiment shown, the cover member 26 has side edges 28 and 30 spaced outwardly of the elongated first and second side edges 14 and 16 of the sheet member 12. The cover member 26 also has U-shaped end edges 32 and 34 spaced outwardly of the U-shaped end edges 18 and 20 of the sheet member 12. In the embodiment shown the cover member 26 has a first layer 36 overlapping and adhered to a first side 38 of the sheet member 12. A second layer 40 of the cover member 26 overlaps and is adhered to a second side 42 of the sheet member 12. The first layer 36 and second layer 40 of the cover member 26 have edges coincident with the U-shaped end edges 32, 34 and side edges 28,30 of the cover member providing overlapped portions 44 at the sides and ends of the heat pad 10. In this embodiment the overlapped portions 44 have a width of about one inch (2.54 cm).

Figure 4:
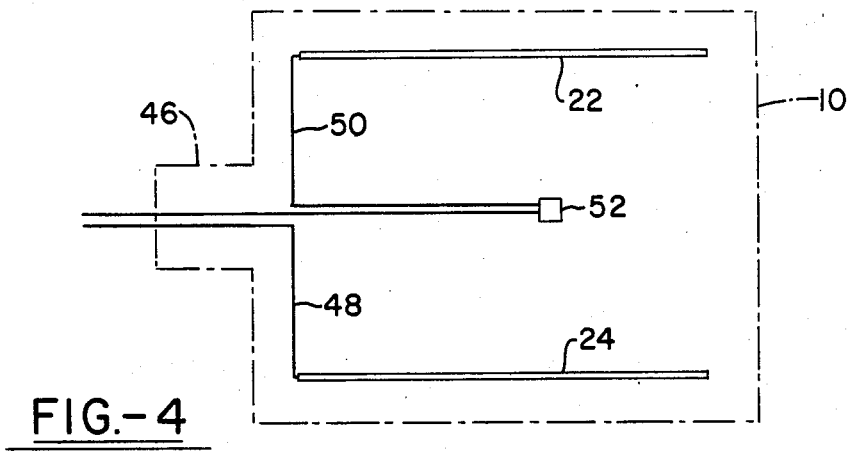
FIG. 4 is a schematic plan view of the heating pad of FIG. 1 showing the electrical connections to the electrodes and thermostat.

The overlapped portions 44 extend outwardly from one end of the heat pad to form a lead portion 46 for wires 48 and 50 connecting a source of electricity to the electrodes 24 and 22. As shown in FIGS. 1 and 4, the wire 50 is connected to the electrode 22 and extends through the overlapped portion 44 to the lead portion 46. The wire 50 also extends to a thermostat 52 located in an intermediate portion 54 of the heating pad 10 and then extends from the thermostat to the lead portion 46. The other wire 48 is connected to the second electrode 24 and extends through one of the overlapped portions 44 to the lead portion 46. The wire 50 and thermostat 52 are insulated in the intermediate portion 54 and, in this embodiment, are wrapped in fiberglass fabric. As shown in FIGS. 1 and 3, the intermediate portion 54 only contains the thermostat 52 and wire 50 and therefore is stretchable in all directions whereas the electrodes 22 and 24 limit the stretching of the heat pad at the first side edge 14 and second side edge 16 of the sheet member 12.

Figure 5:
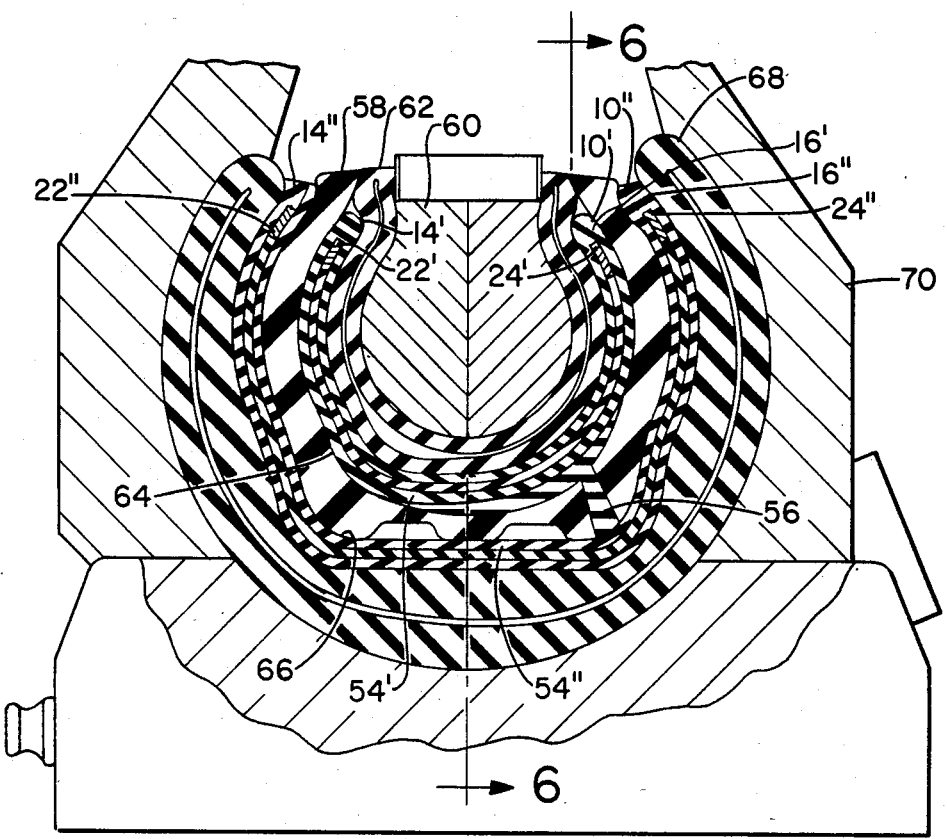
FIG. 5 is a sectional view like FIG. 3 showing a tire being repaired in a spot heater utilizing two heat pads embodying the invention.
Figure 6:
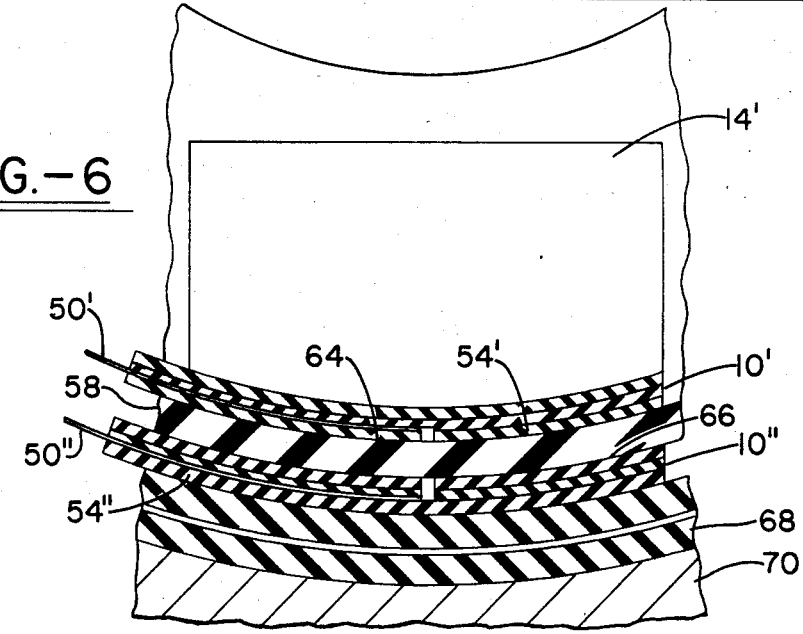
FIG. 6 is a sectional view taken along line 6—6 in FIG. 5.

Referring to FIGS. 5 and 6, an inner heat pad 10' and an outer heat pad 10" are shown in operation during the vulcanization of a tire patch 56. The heat pads 10' and 10" have the construction described hereinabove and are connected to a source of electricity for heating a tire 58 and the patch 56. A mandrel 60 has an airbag 62 wrapped around an outer surface of the mandrel and the heat pad 10' is placed around the airbag. The mandrel 60, airbag 62 and heat pad 10' are then placed inside the tire 58 with the heat pad pressing against the patch 56 and an inner curved surface 64 of the tire. Wrapped around an outer curved surface 66 of the tire 58 is the heat pad 10" which has an outer airbag 68 positioned between the heat pad and a mold 70.

In operation, the outer airbag 68 and the inner airbag 62 are inflated to press the inner heat pad 10' and outer heat pad 10" against the inner curved surface 64 and outer curved surface 66 of the tire 58. The pressure of the airbags 68 and 62 causes the intermediate portions 54', 54" of the heat pads 10'10" to stretch from a configuration shown in FIGS. 1 and 3 to a shape shown in FIGS. 5 and 6 where the intermediate portion is stretched in a direction radially of the tire 58 and in a direction circumferentially of the tire to conform to the curved surfaces 64 and 66 of the tire. At the same time the heat pads 10', 10" do not stretch appreciably at the elongated side edges 14',14" an 16',16" because the electrodes 22',22" and 24',24" in the side edges reinforce and limit the stretching.

After the tire patch 56 has been vulcanized, the airbags 62 and 68 may be deflated and the mold 70 opened to remove the tire 58 from the mold and from the mandrel 60. The heat pads 10' and 10" may then be placed around another tire for vulcanizing another patch 56. Each of the heat pads 10' and 10" may be of a different size although different size tires may be heated with a single size heat pad.

It has been found that different size heat pads may be made for different size tires and the thickness of the first layer 36 and second layer 40 of the cover member 26 is preferably about one-half the thickness of the sheet material 12. For example, in the heat pad 10 where the distance between the side edges 28 and 30 is about 20 inches (50.8 cm) and the distance between the U-shaped end edges 32 and 34 is about 20 inches (50.8 cm), the preferred thickness of the sheet material 12 is about ¼ inch (0.64 cm) and the preferred thickness of the first layer 36 and second layer 40 of the cover member 26 is about ⅛ inch (0.32 cm). In a thermocouple test of this heat pad 10, in operation it took about 60 minutes to bring the temperature of the pad from room temperature up to the desired maximum curing temperature of 300° F. (140° C.). With a heat pad of a similar size of the type utilizing nichrome coiled wires embedded in heat resistant insulating rubber it took about 90 minutes to bring the temperatures of the pad from room temperature up to the desired maximum curing temperature of 300° F. (149° C.). Because the increase in rate of heating with the heat pad 10 of this invention is greater, the time required to bring the heat pad up to the temperature where the curing of the patch 56 will start is shorter. As a result a patch 56 can be cured with the heat pad 10 of this invention in a substantially shorter time than with a heat pad having nichrome coiled wires. This results in a saving in labor costs, equipment costs and energy costs. The cure time is further decreased because the patch material cures faster at higher temperatures. For example, a patch compound which will cure in 60 minutes at 300° F. (149° C.) will take 120 minutes to cure at 290° F. (143° C.).

In a heat pad where the distance between the side edges 26,28 and the distance between the U-shaped end edges 32,34 of the cover member 26 is about 42 inches (106.7 cm), the preferred thickness of the sheet material 12 is about 1/½ inch (1.27 cm) and the preferred thickness of the first layer 36 of the cover member and the second layer 40 of the cover member is about ¼ inch (0.64 cm).

Also in a smaller heat pad where the distance between the side edges 28, 30 and the U-shaped end edges 32,34 of the cover member 26 is about 10 inches (25.4 cm), the preferred thickness of the sheet member 12 is about 1/32 inch (0.08 cm) because it is not desirable to use a layer of insulating rubber material which is less than that thickness.

While a certain representative embodiment and details have been shown for the purpose of demonstrating the invention, it will be apparent to those skilled in the art that various changes and modifications may be made therein without departing from the spirit or scope of the invention.

I claim:

1. A heat pad for pressing against a curved surface of an annular tire to vulcanize a tire patch comprising a channel-shaped sheet member of resilient conductive rubber material having spaced-apart elongated side edges and U-shaped end edges, a first electrode adhered to said sheet member at a position adjacent one of said side edges, a second electrode adhered to said sheet member at a position adjacent the other of said side edges, a cover member of resilient insulating rubber material encasing said sheet member of resilient conductive rubber material having side edges spaced outwardly of said elongated side edges of said U-shaped end edges of said sheet member and said cover member having U-shaped end edges spaced outwardly of said end edges of said sheet member, said cover member further comprising a first layer and a second layer of resilient insulating rubber material having edges coincident with said side edges and U-shaped end edges of said cover member, said first layer overlapping and being adhered to a first side of said sheet member of resilient conductive rubber material, said second layer overlapping and being adhered to a second side opposite said first side of said sheet member and being adhered to overlapped portions of said first layer of resilient insulating rubber material, and wires positioned between said first layer and said second layer in said overlapped portions at the U-shaped end edges of said insulating rubber material, said wires connecting said first electrode and said second electrode to a source of electricity to heat said sheet member of resilient conductive rubber material, said heat pad having an intermediate portion between said first electrode and said second electrode for pressing against said curved surface of said annular tire and said intermediate portion being stretchable in a direction radially of said tire and in a direction circumferentially of said tire to conform to said curved surface of said tire under pressure from a pressing member urging said heat pad against said tire.

2. A heat pad in accordance with claim 1 wherein said heat pad has a thermostat positioned in a surface of said cover member, said thermostat being insulated, and one of said wires being insulated and extending through said sheet member to said thermostat and then to said lead member.

3. A heat pad in accordance with claim 2 wherein said insulated wire and said thermostat are wrapped in fiberglass fabric.

4. A heat pad in accordance with claim 1 wherein said first electrode and said second electrode are of a substantially nonstretchable material located in said spaced-apart elongated side edges of said sheet member of conductive rubber material for limiting deformation and stretching of said pad at said side edges.

5. A heat pad in accordance with claim 4 wherein said nonstretchable material of said first electrode and said second electrode is copper.

6. A heat pad in accordance with claim 1 wherein said resilient conductive rubber material of said sheet member is an acrylic polymer.

7. A heat pad in accordance with claim 6 wherein said resilient conductive rubber material is silicone rubber.

8. A heat pad in accordance with claim 1 wherein said cover member has side edges spaced outwardly of said elongated side edges of said sheet member providing said overlapped portions with a width of about 1 inch (2.54 cm).

9. A heat pad in accordance with claim 1 wherein said first layer and said second layer of said cover member have a thickness of about one-half the thickness of said sheet material.

10. A heat pad in accordance with claim 1 wherein the thickness of said first layer and said second layer of said cover member is about ⅛ inch (0.32 cm) and the thickness of said sheet member is about ¼ inch (0.64 cm), the distance between said side edges of said cover member is about 20 inches (50.8 cm) and the distance between said U-shaped end edges of said cover member is about 20 inches (50.8 cm).

11. A heat pad in accordance with claim 1 wherein the thickness of said first layer and said second layer of said cover member is about ¼ inch (0.64 cm) and the thickness of said sheet member is about ½ inch (1.27 cm), the distance between said side edges of said cover member is about 42 inches (106.7 cm) and the distance between said U-shaped end edges of said cover member is about 42 inches (106.7 cm).

12. A heat pad in accordance with claim 1 wherein the thickness of said first layer and said second layer of said cover member is about 1/32 inch (0.08 cm) and the thickness of said sheet member is about 1/32 inch (0.08 cm), the distance between said side edges of said cover member is about 10 inches (25.4 cm) and the distance between said U-shaped end edges of said cover member is about 10 inches (25.4 cm).

* * * * *